United States Patent [19]

Wamura et al.

[11] Patent Number: 5,115,052

[45] Date of Patent: May 19, 1992

[54] PROCESS FOR PRODUCING CYCLOOLEFIN RANDOM COPOLYMERS

[75] Inventors: Hiroo Wamura; Shunyo Uesugi; Takashi Hayashi, all of Kuga, Japan

[73] Assignee: Mitsui Petrochemical Industries, Ltd., Tokyo, Japan

[21] Appl. No.: 670,485

[22] Filed: Mar. 13, 1991

Related U.S. Application Data

[63] Continuation-in-part of Ser. No. 403,371, Sep. 6, 1989, abandoned.

[30] Foreign Application Priority Data

Sep. 7, 1988 [JP] Japan .................. 63-223777

[51] Int. Cl.$^5$ .............. C08F 2/06; C08F 232/04; C08F 232/08
[52] U.S. Cl. ..................... 526/87; 526/281; 526/169.2
[58] Field of Search ............. 526/87, 281, 169.2

[56] References Cited

U.S. PATENT DOCUMENTS 3,738,974  6/1973  Takehisa et al. .............. 526/87 X

FOREIGN PATENT DOCUMENTS 0156464 10/1985 European Pat. Off. ............ 526/281
0203799 12/1986 European Pat. Off. ............ 526/281

*Primary Examiner*—Fred Teskin
*Attorney, Agent, or Firm*—Sherman and Shalloway

[57] ABSTRACT

Disclosed herein is a process for the production of cycloolefin random copolymers comprising copolymerizing ethylene with at least one specific cyclooloefin in a liquid phase in the presence of a catalyst and a solvent in a polymerization vessel, wherein ethylene is copolymerized with the cycloolefin while feeding the cycloolefin or a mixture of the cycloolefin and the solvent onto inside circumferential wall of the polymerization vessel above the gas-liquid interface in the polymerization vessel. The proposed process ensures a smooth copolymerization reaction and a continuous and stable running of the apparatus for a prolonged period of time, and is productive of ethylene-cycloolefin random copolymers which have a uniform quaility and are excellent in heat resistance, heat aging property and various mechanical properties.

5 Claims, No Drawings

PROCESS FOR PRODUCING CYCLOOLEFIN RANDOM COPOLYMERS

This application is a continuation-in-part, of application Ser. No. 07/403,371 filed Sep. 6, 1989, now abandoned.

FIELD OF THE INVENTION

The invention relates to a process for the production of cycloolefin random copolymers. More particularly, it relates to a process for the production of cycloolefin random copolymers which are excellent in heat resistance, heat aging property and various mechanical properties.

BACKGROUND OF THE INVENTION

It has been recently found that random copolymers of ethylene and bulky cycloolefins are excellent in transparencey and have balanced heat resistance, heat property, chemical resistance, solvent resistance, dielectric characteristics and mechanical properties, and thus, exhibit excellent performances in the field of optical materials such as optical memory discs and optical fibers. On the basis of the above findings various technical proposals concerning the copolymers of ethylene and bulky cycloolefins are disclosed in U.S. Pat. No. 4,614,778, Japanese patent Laid-open Publication Nos. 61-98780, 61-115,916 and 61-120,816.

The inventors have found some problems that upon continuous copolymerization of ethylene with a bulky cycloolefin in a polymerization vessel equipped with a stirrer, although depending upon the reaction conditions, undesirable copolymers which have unduly high content of ethylene and are insoluble in a hydrocarbon solvent used in the polymerization reaction (referred to hereinafter as solvent-insoluble copolymers) are liable to be formed on the wall of the polymerization vessel in the vicinity of the gas-liquid interface in the vessel, that the solvent-insoluble copolymers formed on the wall of the vessel in the vicinity of the gas-liquid inerface invite changes in conditions of the gas-liquid interface with time and, when formed in large amounts, result in decrease of the effective area of the gas-liquid interface, that on that acount the copolymerization of ethylene and the cycloolefin does not proceed sufficiently, and that the solvent-insoluble copolymers formed on the wall of the vessel fall off in the liquid phase in the vessel, withdrawn through a pick up line together with the desired copolymer produced, and trapped by a filtering device installed in the pick up line to clogg the filtering device and occasionally the pick up line in itself, thereby hindering a continuous and stable running of a series of apparatus for the production of the ethylene-cycloolefin random copolymers including the filtering device.

OBJECT OF THE INVENTION

The invention intends to solve the above discussed problems associated with the inventors' findings, and an object of the invention is to provide a process for the production of cycloolefin random copolymers by copolymerizing ethylene with at least one cycloolefin in a polymerization vessel where particular conditions are set, which process is capable of ensuring a smooth copolymerzation of ethylene and the cycloolefin and maintaining a continuous and stable running of the apparatus for the production of ethylene-cycloolefin random copolymers for a prolonged period of time, and which is productive of ethylene-cycloolefin random copolymers which have a uniform quality and are excellent in heat resistance, heat aging property and various mechanical properties.

SUMMARY OF THE INVENTION

A process for the production of cycloolefin random copolymers according to the invention comprises copolymerizing ethylene with at least one cycloolefin of the general formula [I] noted below in a liquid phase in the presence of a catalyst and a solvent in a polymerization vessel, wherein ethylene is copolymerized with the cycloolefin while feeding the cycloolefin or a mixture of the cycloolefin and the solvent onto inside circumferential wall of the polymerization vessel above the gas-liquid interface in the polymerization vessel.

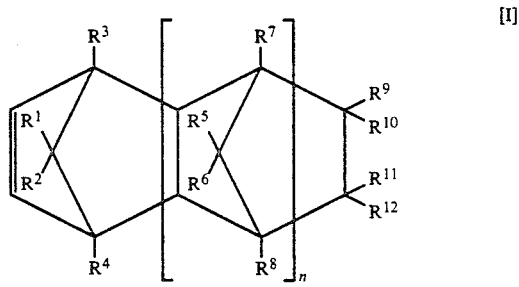

wherein n is 0 or a positive integer, and $R^1$ to $R^{12}$ are the same or different, and each represents a hydrogen or halogen atom or a hydrocarbon group, or $R^9$ (or $R^{10}$) and $R^{11}$ (or $R^{12}$), when taken together, may form a mono- or poly-cyclic ring.

The process for the production of cycloolefin random copolymers according to the invention ensures a smooth copolymerization of ethylene and the cycloolefin and a continuous and stable running of the apparatus for the production of ethylenecycloolefin random copolymers, and is productive of ethylenecycloolefin random copolymers which have a uniform quality and are excellent in heat resistance, heat aging property and various mechanical properties.

Detailed Description of the Invention

The steps of the process for the production of cycloolefin random copolymers according to the invention will now be specifically described in sequence.

Cycloolefin Monomers

In the process according to the invention, at least one cycloolefin of the general formula [I] noted below is copolymerized with ethylene.

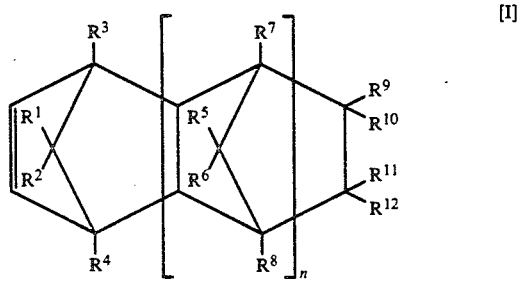

In the general formula [I], n is 0 or a positive integer, and $R^1$ to $R^{12}$ are the same or different, and each represents a hydrogen or halogen atom or a hydrocarbon group, or $R^9$ (or $R^{10}$) and $R^{11}$ (or $R^{12}$), when taken together, may form a mono- or poly-cyclic ring.

The cycloolefins represented by the general formula [I] can be easily prepared by condensation of cyclopentadienes with appropriate olefins by Diels-Alder reaction.

Examples of the cycloolefins represented by the general formula [I] include such compounds as exemplified in Table 1, and in addition to 1,4,5,8-dimethano-1,2,3,4,4a,5,8,8a-octahydronaphthalene, such octahydronaphthalenes as 2-methyl-1,4,5,8-dimethano-1,2,3,4,4a,5,8,8a-octahydronaphthalene, 2-ethyl-1,4,5,8-dimethano-1,2,3,4,4a,5,8,8a-octahydronaphthalene, 2-propyl-1,4,5,8-dimethano-1,2,3,4,4a,5,8,8a-octahydronaphthalene, 2-hexyl-1,4,5,8-dimethano-1,2,3,4,4a,5,8,8a-octahydronaphthalene, 2-stearyl-1,4,5,8-dimethano-1,2,3,4,4a,5,8,8a-octahydronaphthalene, 2,3-dimethyl-1,4,5,8-dimethano-1,2,3,4,4a,5,8,8a-octahydronaphthalene, 2-methyl-3-ethyl-1,4,5,8-dimethano-1,2,3,4,4a,5,8,8a-octahydronaphthalene, 2-chloro-1,4,5,8-dimethano-1,2,3,4,4a,5,8,8a-octahydronaphthalene, 2-bromo-1,4,5,8-dimethano-1,2,3,4,4a,5,8,8a-octahydronaphthalene, 2-fluoro-1,4,5,8-dimethano-1,2,3,4,4a,5,8,8a-octahydronaphthalene, 2,3-dichloro-1,4,5,8-dimethano-1,2,3,4,4a,5,8,8a-octahydronaphthalene, 2-cyclohexyl-1,4,5,8-dimethano-1,2,3,4,4a,5,8,8a-octahydronaphthalene, 2-n-butyl-1,4,5,8-dimethano-1,2,3,4,4a,5,8,8a-octahydronaphthalene and 2-isobutyl-1,4,5,8-dimethano-1,2,3,4,4a,5,8,8a-octahydronaphthalene.

| Chemical formula | Compound name |
|---|---|
| | Bicyclo[2,2,1]hept-2-ene |
| —CH₃ | 6-Methylbicyclo[2,2,1]hept-ene |
| —CH₃ —CH₃ | 5,6-Dimethylbicyclo[2,2,1]hept-2-ene |
| CH₃ | 1-Methylbicyclo[2,2,1]hept-2-ene |
| —C₂H₅ | 6-Ethylbicyclo[2,2,1]hept-2-ene |
| —C₄H₉ | 6-Butylbicyclo[2,2,1]hept-2-ene |
| —iC₄H₉ | 6-Isobutylbicyclo[2,2,1]hept-2-ene |
| CH₃ | 7-Methylbicyclo[2,2,1]hept-2-ene |
| | Tetracyclo[4,4,0,1$^{2.5}$,1$^{7.10}$]-3-dodecene |

| Chemical formula | Compound name |
|---|---|
| | 8-Methyltetracyclo[4,4,0,1$^{2.5}$,1$^{7.10}$]-3-dodecene |
| | 8-Ethyltetracyclo[4,4,0,1$^{2.5}$,1$^{7.10}$]-3-dodecene |
| | 8-Propyltetracyclo[4,4,0,1$^{2.5}$,1$^{7.10}$]-3-dodecene |
| | 8-Hexyltetracyclo[4,4,0,1$^{2.5}$,1$^{7.10}$]-3-dodecene |
| | 8-Stearyltetracyclo[4,4,0,1$^{2.5}$,1$^{7.10}$]-3-dodecene |
| | 8,9-Dimethyltetracyclo[4,4,0, 1$^{2.5}$,1$^{7.10}$]-3-dodecene |
| | 8-Methyl-9-ethyltetracyclo[4,4,0, 1$^{2.5}$,1$^{7.10}$]-3-dodecene |
| | 8-Chlorotetracyclo[4,4,0,1$^{2.5}$,1$^{7.10}$]-3-dodecene |
| | 8-Bromotetracyclo[4,4,0,1$^{2.5}$,1$^{7.10}$]-3-dodecene |
| | 8-Fluorotetracyclo[4,4,0,1$^{2.5}$,1$^{7.10}$]-3-dodecene |
| | 8,9-Dichlorotetracyclo[4,4,0,1$^{2.5}$,1$^{7.10}$]-3-dodecene |
| | 8-Cyclohexyltetracyclo[4,4,0,1$^{2.5}$,1$^{7.10}$]-3-dodecene |

-continued

| Chemical formula | Compound name |
|---|---|
| 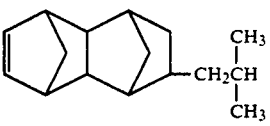 | 8-Isobutyltetracyclo[4,4,0,1$^{2.5}$,1$^{7.10}$]-3-dodecene |
| 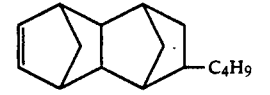 | 8-Butyltetracyclo[4,4,0,1$^{2.5}$,1$^{7.10}$]-3-dodecene |
| 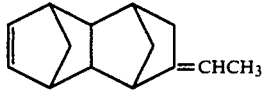 | 8-Ethylidenetetracyclo[4,4,0,1$^{2.5}$,1$^{7.10}$]-3-dodecene |
| 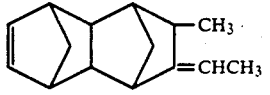 | 8-Ethylidene-9-methyltetracyclo[4,4,0,1$^{2.5}$,1$^{7.10}$]-3-dodecene |
| 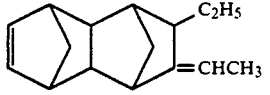 | 8-Ethylidene-9-ethyltetracyclo[4,4,0,1$^{2.5}$,1$^{7.10}$]-3-dodecene |
| 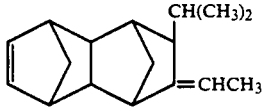 | 8-Ethylidene-9-isopropyltetracyclo[4,4,0.1$^{2.5}$,1$^{7.10}$]-3-dodecene |
| 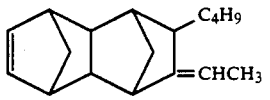 | 8-Ethylidene-9-butyltetracyclo[4,4,0,1$^{2.5}$,1$^{7.10}$]-3-dodecene |
| 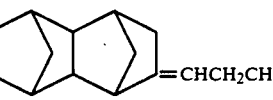 | 8-n-Propylidenetetracyclo[4,4,0.1$^{2.5}$,1$^{7.10}$]-3-dodecene |
| 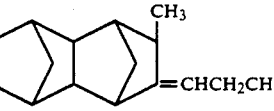 | 8-n-Propylidene-9-methyltetracyclo[4,4,0,1$^{2.5}$,1$^{7.10}$]-3-dodecene |
| 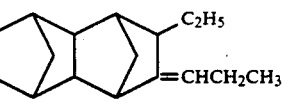 | 8-n-Propylidene-9-ethyltetracyclo[4,4,0,1$^{2.5}$,1$^{7.10}$]-3-dodecene |
| 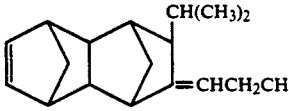 | 8-n-Propylidene-9-isopropyltetracyclo[4,4,0,1$^{2.5}$,1$^{7.10}$]-3-dodecene |
| 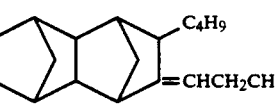 | 8-n-Propylidene-9-butyltetracyclo[4,4,0,1$^{2.5}$,1$^{7.10}$]-3-dodecene |
| 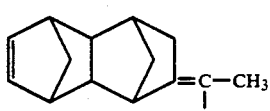 | 8-Isopropylidenetetracyclo[4,4,0,1$^{2.5}$,1$^{7.10}$]-3-dodecene |

-continued

| Chemical formula | Compound name |
|---|---|
| 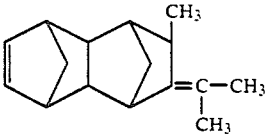 | 8-Isopropylidene-9-methyltetracyclo[4,4,0,1$^{2,5}$,1$^{7,10}$]-3-dodecene |
| 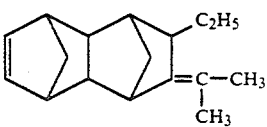 | 8-Isopropylidene-9-ethyltetracyclo[4,4,0,1$^{2,5}$,1$^{7,10}$]-3-dodecene |
| 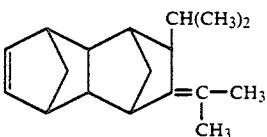 | 8-Isopropylidene-9-isopropyltetracyclo[4,4,0,1$^{2,5}$,1$^{7,10}$]-3-dodecene |
| 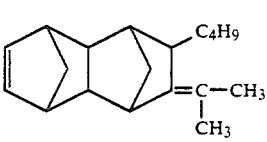 | 8-Isopropylidene-9-butyltetracyclo[4,4,0,1$^{2,5}$,1$^{7,10}$]-3-dodecene |
| 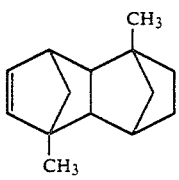 | 5,10-Dimethyltetracyclo[4,4,0,1$^{2,5}$,1$^{7,10}$]-3-dodecene |
| 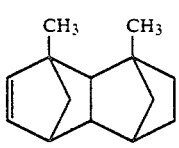 | 2,10-Dimethyltetracyclo-[4,4,0,1$^{2,5}$,1$^{7,10}$]-3-dodecene |
| 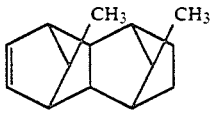 | 11,12-Dimethyltetracyclo-[4,4,0,1$^{2,5}$,1$^{7,10}$]-3-dodecene |
| 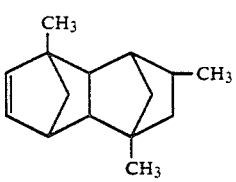 | 2,7,9-Trimethyltetracyclo-[4,4,0,1$^{2,5}$,1$^{7,10}$]-3-dodecene |
| 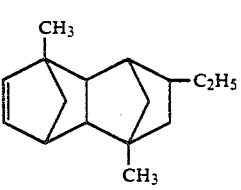 | 9-Ethyl-2,7-dimethyltetracyclo-[4,4,0,1$^{2,5}$,1$^{7,10}$]-3-dodecene |
| 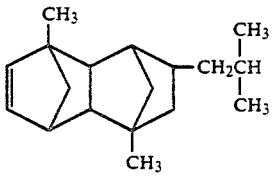 | 9-Isobutyl-2,7-dimethyltetracyclo-[4,4,0,1$^{2,5}$,1$^{7,10}$]-3-dodecene |

-continued

| Chemical formula | Compound name |
|---|---|
| | 9,11,12-Trimethyltetracyclo-[4,4,0,1$^{2.5}$,1$^{7.10}$]-3-dodecene |
| | 9-Ethyl-11,12-dimethyltetracyclo-[4,4,0,1$^{2.5}$,1$^{7.10}$]-3-dodecene |
| | 9-Isobutyl-11,12-dimethyltetracyclo-[4,4,0,1$^{2.5}$,1$^{7.10}$]-3-dodecene |
| | 5,8,9,10-Tetramethyltetracyclo-[4,4,0,1$^{2.5}$,1$^{7.10}$]-3-dodecene |
| | Hexacyclo[6,6,1,1$^{3.6}$,1$^{10.13}$,0$^{2.7}$,0$^{9.14}$]-4-heptadecene |
| | 12-Methylhexacyclo[6,6,1,1$^{3.6}$,1$^{10.13}$,0$^{2.7}$,0$^{9.14}$]-4-heptadecene |
| | 12-Ethylhexacyclo[6,6,1,1$^{3.6}$,1$^{10.13}$,0$^{2.7}$,0$^{9.14}$]-4-heptadecene |
| | 12-Isobutylhexacyclo[6,6,1,1$^{3.6}$,1$^{10.13}$,0$^{2.7}$,0$^{9.14}$]-4-heptadecene |
| | 1,6,10-Trimethyl-12-isobutyl-hexacyclo[6,6,1,1$^{3.6}$,1$^{10.13}$,0$^{2.7}$,0$^{9.14}$]-4-heptadecene |
| | Octacyclo[8,8,0,1$^{2.9}$,1$^{4.7}$,1,$^{11.18}$,1$^{13.16}$,0$^{3.8}$,0$^{12.17}$]-5-docosen |
| | 15-Methyloctacyclo[8,8,0,1$^{2.9}$,1$^{4.7}$,1,$^{11.18}$,1$^{13.16}$,0$^{3.8}$,0$^{12.17}$]-5-docosen |
| | 15-Ethyloctacyclo]8,8,0,1$^{2.9}$,1$^{4.7}$,1,$^{11.18}$,1$^{13.16}$,0$^{3.8}$,0$^{12.17}$]-5-docosen |

-continued

| Chemical formula | Compound name |
|---|---|
| | Pentacyclo[6,6,1,1$^{3.6}$,0$^{2.7}$,0$^{9.14}$]-4-hexadecene |
| | 1,3-Dimethylpentacyclo[6,6,1,1$^{3.6}$,0$^{2.7}$,0$^{9.14}$]-4-hexadecene |
| | 1,6-Dimethylpentacyclo[6,6,1,1$^{3.6}$,0$^{2.7}$,0$^{9.14}$]-4-hexadecene |
| | 15,16-Dimethylpentacyclo[6,6,1,1$^{3.6}$,0$^{2.7}$,0$^{9.14}$]-4-hexadecene |
| | Pentacyclo[6,5,1,1$^{3.6}$,0$^{2.7}$,0$^{9.13}$]-4-pentadecene |
| | 1,3-Dimethylpentacyclo[6,5,1,1$^{3.6}$,0$^{2.7}$,0$^{9.13}$]-4-pentadecene |
| | 1,6-Dimethylpentacyclo[6,5,1,1$^{3.6}$,0$^{2.7}$,0$^{9.13}$]-4-pentadecene |
| | 14,15-Dimethylpentacyclo[6,5,1,1$^{3.6}$,0$^{2.7}$,0$^{9.13}$]-4-pentadecene |
| | Heptacyclo[8,7,0,1$^{2.9}$,1$^{4.7}$,1$^{11.17}$,0$^{3.8}$,0$^{12.16}$]-5-icosene |
| | Heptacyclo[8,8,0,1$^{2.9}$,1$^{4.7}$,1$^{11.18}$,0$^{3.8}$,0$^{12.17}$]-5-icosene |
| | Pentacyclo[6,5,1,1$^{3.6}$,0$^{2.7}$,0$^{9.13}$]-4,10-pentadecadiene |
| | Tricyclo[4,3,0,1$^{2.5}$]-3-decene |

| Chemical formula | Compound name |
|---|---|
| [structure with CH₃] | 2-Methyl-tricyclo[4,3,0,1$^{2.5}$]-3-decene |
| [structure with CH₃] | 5-Methyl-tricyclo[4,3,0,1$^{2.5}$]-3-decene |
| [structure] | Tricylo[4,4,0,1$^{2.5}$]-3-undecene |
| [structure with CH₃] | 10-Methyl-tricyclo[4,4,0,1$^{2.5}$]-3-undecene |
| [structure] | Pentacyclo[4,7,0,1$^{2.5}$,0$^{8.13}$,1$^{9.12}$]-3-pentadecene |
| [structure with CH₃] | Methyl-substituted pentacyclo [4,7,0,1$^{2.5}$,0$^{8.13}$,1$^{9.12}$]-3-pentadecene |
| [structure] | Heptacyclo[7,8,0,1$^{3.6}$,0$^{2.7}$,1$^{10.17}$, 0$^{11.16}$,1$^{12.15}$]-4-icosene |
| [structure with CH₃ CH₃] | Dimethyl-substituted heptacyclo [7,8,0,1$^{3.6}$,0$^{2.7}$,1$^{10.17}$,0$^{11.16}$,1$^{12.15}$]-4-icosene |
| [structure] | Nonacyclo[9,10,1,1$^{4.7}$,0$^{3.8}$,0$^{2.10}$,0$^{12.21}$, 1$^{13.20}$,0$^{14.19}$,1$^{15.18}$]-5-pentacosene |
| [structure with CH₃ CH₃ CH₃] | Trimethyl-substituted nonacyclo [9,10,1,1$^{4.7}$,0$^{3.8}$,0$^{2.10}$,0$^{12.21}$,1$^{13.20}$, 0$^{14.19}$,1$^{15.18}$]-5-pentacosene |

In the process according to the invention, ethylene is copolymerized with at least one cycloolefin of the general formula[I]. In addition to said two essential components, however, there may be optionally copolymerized other copolymerizable unsaturated monomers in such a range that they do not mar the object of the invention. Examples of the unsaturated monomers which may optionally be copolymerized ethylene and at least one cycloolefin of the general formula [I], include α-olefins having from 3 to 20 carbon atoms, such as propylene, 1-butene, 4-methyl-1-pentene, 1-hexene, 1-octene, 1-decene, 1-dodecene, 1-tetradecene, 1-hexadecene, 1-octadecene and 1-icosene, in such a proportion that the resulting cycloolefin random copolymer may contain units derived therefrom in an amount less than an equimolar amount of units derived from ethylene; cylcoolefins, such as cyclopentene, cyclohexene, 3-methylcyclohexene, cyclooctene and 3a, 5, 6, 7a-tetrahydro-4, 7-methano-1H-indene of the formula:

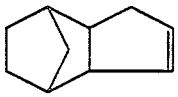

in such a proportion that the resulting cycloolefin random copolymer may contain units derived therefrom in an amount less than an equimolar amount of units derived from the cycloolefin of the general formula [I]; non-conjugated dienes, such as 1,4-hexadiene, 4-methyl-1,4-hexadiene, 5-methyl-1,4-hexadiene. 1,7-octadiene, dicyclopentadiene, 5-ethylidene-2-norbornene and 5-vinyl-2-norbornene, in such a proportion that the resulting cycloolefin random copolymer may contain units derived therefrom in an amount less than an equimolar amount of units derived from the cycloolefin of the general formula [I]; and norbornene compounds, such as norbornene-2, 5-methylnorbornene-2, 5-ethylnorbornene-2, 5-isopropylnorbornene-2, 5-n-butylnorbornene-2, 5-i-butylnorbornene-2, 5,6-dimethylnorbornene-2, 5-chloronorbornene-2, 2-fluoronorbornene-2 and 5,6-dichloronorbornene-2, in such a proportion that the resulting cycloolefin random copolymer may contain units derived therefrom in an amount less than an equimolar amount of units derived from the cycloolefin of the general formula [I].

Solvents

In the process according to the invention, ethylene is copolymerized with at least one cycloolefin of the general formula [I] in a hydrocarbon solvent. The hydrocarbon solvents herein include aliphatic hydrocarbons such as hexane, heptane, octane, and kerosene; alicyclic hydrocarbons such as cyclohexane and methylcyclohexane; aromatic hydrocarbons such as benzene, toluene and xylene; and the above-illustrated cycloolefins of the general formula [I], alone or in combination. When these solvents are mixed with the above mentioned cycloolefin monomer, the homogeneous solutions are formed.

Catalysts

In the process according to the invention, ethylene is copolymerized with at least one cycloolefin of the general formula [I] in the presence of a catalyst. Suitable catalysts which can be used herein comprise a vanadium compound which is soluble in the particular hydrocarbon solvent used and an organoaluminum compound.

The vanadium compounds as one component of the catalyst, include compounds of the general formula $VO(OR)_aX_b$ or $V(OR)_cX_d$ wherein R is a hydrocarbon group, and a, b, c and d are numbers satisfying $0 \leq a \leq 3$, $0 \leq b \leq 3$, $2 \leq a+b \leq 3$, $0 \leq c \leq 4$, $0 \leq d \leq 4$, and $3 \leq c+d \leq 4$; and their adducts with an electron donor. Examples of the vanadium compound include, for example, $VO(Cl_3)$, $VO(OC_2H_5)Cl_2$, $VO(OC_2H_5)_2Cl$, $VO(O\text{-iso-}C_3H_7)Cl_2$, $VO(O\text{-n-}C_4H_9)Cl_2$, $VO(OC_2H_5)_3$, $VCl_4$, $VOCl_2$, $VOBr_2$, $VO(O\text{-n-}C_4H_9)_3$ and $VCl_3 \cdot 20C_8H_{17}OH$.

Electron donors which can be used for the preparation of the vanadium component of the catalyst may be oxygen-containing electron donors such as alcohols, phenols, ketones, aldehydes, carboxylic acids, esters of organic and inorganic acids, ethers, acid amides, acid anhydrides and alkoxysilanes; or nitrogen-containing electron donors such as ammonia, amines, nitriles and isocyanates. Examples of suitable electron donors include, for example, alcohols having from 1 to 18 carbon atoms, such as methanol, ethanol, propanol, isopropanol, pentanol, hexanol, octanol, dodecanol, octadecyl alcohol, oleyl alcohol, benzyl alcohol, phenylethyl alcohol, isopropylbenzyl alcohol and cumyl alcohol; phenols having from 6 to 20 carbon atoms which may include a lower alkyl group or groups attached to the aromatic ring, such as phenol, cresols, xylenols, ethylphenols, propylphenols, nonylphenols, cumylphenols and naphthols; ketones having from 3 to 15 carbon atoms, such as acetone, methyl ethyl ketone, methyl isobutyl ketone, acetophenone, benzophenone and benzoquinone; aldehydes having from 2 to 15 carbon atoms, such as acetaldehyde, propionaldehyde, octylaldehyde, benzaldehyde, tolualdehydes and naphthoaldehydes; organic acid esters having from 2 to 30 carbon atoms, such as methyl formate, methyl acetate, ethyl acetate, vinyl acetate, propyl acetate, octyl acetate, cyclohexyl acetate, ethyl propionate, methyl butyrate, ethyl valerate, methyl chloroacetate, ethyl dichloroacetate, methyl methacrylate, ethyl crotonate, ethyl cyclohexanecarboxylate, methyl benzoate, ethyl benzoate, propyl benzoate, butyl benzoate, octyl benzoate, cyclohexyl benzoate, phenyl benzoate, benzyl benzoate, methyl toluylates, ethyl toluylates, amyl toluylates, ethyl ethylbenzoates, methyl anisates, n-butyl maleate, diisobutyl methylmalonate. di-n-hexyl cyclohexenecarboxylate, diethyl nadinate, diisopropyl tetrahydrophthalate, diethyl phthalate, diisobutyl phthalate, di-n-butyl phthalate, di-2-ethylhexyl phthalate, γ-butyrolactone, δ-valerolactone, coumarin, phthalide and ethylene carbonate; acid halides having from 2 to 15 carbon atoms, such as acetyl chloride, benzoyl chloride, toluyl chloride and anisic acid chloride; ethers having from 2 to 20 carbon atoms, such as methyl ether, ethyl ether, isopropyl ether, butyl ether, amyl ether, tetrahydrofuran, anisole and diphenyl ether; acid amides such as acetamide, benzamide and toluamides; amines such as methyl amine, ethyl amine, diethyl amine, tributyl amine, piperidine, tribenzyl amine, aniline, pyridine, picolines and tetramethylenediamine; nitriles such as acetonitrile, benzonitrile and tolunitriles; and alkoxysilanes such as ethyl silicate and diphenylmethoxysilane. The illustrated electron donors may be used alone or in combination.

As the organoaluminum compound of the other component of the catalyst, compounds having at least one Al-C bond in the molecule can be used. One group of such organoaluminum compounds may be represented by the general formula (i)

$$R^1_m Al(OR^2)_n H_p X_q \qquad \text{(i)}$$

wherein $R^1$ and $R^2$ are the same or different, and each represents a hydrocarbon group having normally from 1 to 15, preferably from 1 to 4 carbon atoms, X is halogen and m, n, p and q are numbers satisfying $0 \leq m \leq 3$; $0 \leq n < 3$; $0 \leq p < 3$; $0 \leq q < 3$; and $m+n+p+q=3$. Another group of such compounds are complex compounds of aluminum and a metal of Group I represented by the general formula (ii)

$$M^1 AlR^1_4 \qquad \text{(ii)}$$

wherein $M^1$ is Li, Na or K, and $R^1$ is as defined above.

The organoaluminum compounds of the general formula (i) include those of the general formula $$R^1{}_m Al(OR^2)_{3-m}$$

wherein $R^1$ and $R^2$ are as defined above, and m is a number preferably satisfying $1.5 \leq m < 3$; those of the general formula $$R^1{}_m AlX_{3-m}$$

wherein $R^1$ and X are as defined above, and m is a number preferably satisfying $0 < m < 3$; those of the general formula $$R^1{}_m AlH_{3-m}$$

wherein $R^1$ is as defined above, and m is a number preferably satisfying $2 \leq m < 3$; and those of the general formula $$R^1{}_m Al(OR^2)_n X_q$$

wherein $R^1$, $R^2$ and X are as defined above, and m, n and q are numbers satisfying $0 < m \leq 3$, $0 \leq n < 3$, $0 \leq q < 3$ and $m + n + q = 3$.

Examples of the organoaluminum compound of the general formula (i) include, for example, trialkylaluminums such as triethylaluminum, triisopropylaluminum and tributylaluminum; partly alkoxylated alkylaluminums including, in addition to dialkylaluminum alkoxides such as diethylaluminum ethoxide and dibutylaluminum butoxide, alkylaluminum sesquialkoxides such as ethylaluminum sesquiethoxide and butylaluminum sesquibutoxide, and those having such an average composition as, for example, $R^1{}_{2.5}Al(OR^2)_{0.5}$; partly halogenated alkylaluminum halides including dialkylaluminum halides such as diethylaluminum chloride, dibutylaluminum chloride and diethylaluminum bromide, alkylaluminum sesquihalides such as ethylaluminum sesquichloride, butylaluminum sesquichloride and ethylaluminum sesquibromide, and alkylaluminum dihalides such as ethylaluminum dichloride, propylaluminum dichloride and butylaluminum dibromide; partly hydrogenated alkylaluminums including dialkylaluminum hydrides such as diethylaluminum hydride and dibutylaluminum hydride and alkylaluminum dihydrides such as ethylaluminum dihydride and propylaluminum dihydride; and partly alkoxylated and halogenated alkylaluminums such as ethylaluminum ethoxychloride, butylaluminum butoxychloride and ethylaluminum ethoxybromide. Furthermore, organoaluminum compounds in which two aluminum atoms are attached to one and the same oxygen or nitrogen atom, such as $$(C_2H_5)_2AlOAl(C_2H_5)_2,$$

$$(C_4H_9)_2AlOAl(C_4H_9)_2 \text{ and}$$

$$(C_2H_5)_2Al\underset{\underset{C_6H_5}{|}}{N}Al(C_2H_5)_2,$$

may also be used as the organoaluminum component of the catalyst.

Examples of the organoaluminum compound of the general formula (ii) include, for example, $LiAl(C_2H_5)_4$ and $LiAl(C_7H_{15})_4$.

Particularly preferred organoaluminum compounds which can be used herein as the organoaluminum component of the catalyst, are dialkylaluminum halides and alkylaluminum dihalides and mixtures thereof.

In the process according to the invention, the copolymerization is carried out continuously as hereinafter described in detail, and both the catalyst components are normally respectively diluted with the hydrocarbon solvent described above and fed to the polymerization vessel. A concentration of the vanadium compound fed to the reaction system is normally not higher than 10 times, preferably from 1 to 7 times, more preferably from 1 times the concentration of the vanadium compound present in the reaction system. Whereas a concentration of the organoaluminum compound fed to the reaction system may be not higher than 50 times the concentration of the vanadium compound present in the reaction system.

The concentration of the vanadium compound present in the reaction system is normally from 0.01 to 5 gram atom of V/liter, preferably from 0.05 to 3 gram atom of V/liter, and the atomic ratio of the aluminum atom to the vanadium atom (Al/V) in the reaction system is normally at least 2, preferably from 2 to 50, in particular from 3 to 20.

Polymerization

In the process according to the invention the copolymerization of ethylene and the cycloolefin is carried out in a polymerization vessel equipped with a stirrer. The polymerization vessel is further equipped with a cooler, for example, a shell-and-tube heat exchanger for maintaining the polymerization temperature substantially constant and with a circulating line for picking up the polymerization liquid from the bottom of the vessel, circulating it through the heat exchanger and returning it to the vessel by means of a circulating pump installed in the circulating line.

There are gas and liquid phases in the polymerization vessel. In the gas phase there are present ethylene and optionally hydrogen gas as a molecular weight regulator and an inert gas. In the liquid phase there are present the cycloolefin, solvent and catalyst.

Of these components which are present in the polymerization vessel, at least a part of the cycloolefin or at least a part of both the cycloolefin and the solvent is fed onto the inside circumferential wall of the vessel above the gas-liquid interface in the vessel, and allowed to flow down along the wall to the liquid phase.

The liquid cycloolefin alone or the homogeneous solution of the mixture of cycloolefin and the solvent may be fed onto the inside circumferential wall of the vessel above the gas-liquid interface in the vessel by spraying it by means of a spray disc or a nozzle disposed in the gas phase in the polymerization vessel. Alternatively, the liquid cycloolefin alone or the homogeneous solution of the mixture of cycloolefin and the solvent may be fed simply by pouring it onto the inside circumferential wall of the vessel above the gas-liquid interface in the vessel. The feeding may be carried out continuously or intermittently.

It has been found that by feeding the liquid cycloolefin alone or the homogeneous solution of the mixture of cycloolefin and the solvent onto the inside circumferential wall of the vessel above the gas-liquid interface in the vessel, formation of the above-mentioned undesirable solvent-insoluble copolymers on the inside circumferential wall of the polymerization vessel can be effectively controlled.

In the case wherein the cycloolefin admixed with a solvent is fed to the vessel, while the solvent is normally the same as the hydrocarbon solvent already present in the liquid phase in the vessel.

From the views of preventing the formation of the solvent-insoluble copolymers on the inside circumferential wall of the polymerization vessel and the productivity of the cycloolefin random copolymers, it is desirable to carry out the copolymerization in the presence of at least 5 wt %, preferably more than 10 wt %, especially more than 30 wt % of the cycloolefin monomer in the homogeneous solution of cycloolefin monomer and the hydrocarbon solvent.

During the polymerization, the gas-liquid interface in the polymerization vessel is preferably controlled by means of a level controlling valve so that a level of the gas-liquid interface may be kept substantially constant.

The copolymerization of ethylene and the cycloolefin in the process according to the invention is carried out at a temperature of normally from $-50°$ to $100°$ C., preferably from $-30°$ to $80°$ C., more preferably from $-20°$ to $60°$ C.

In the process according to the invention the copolymerization of ethylene and the cycloolefin is normally carried out continuously. In this case, the monomers including ethylene, at least one cycloolefin of the general formula [I] and optionally one or more other copolymerizable monomers; the catalyst components, that is, the soluble vanadium compound and the organoaluminum compound, and the hydrocarbon solvent, are continuously fed to the polymerization system, while the polymerization reaction mixture is continuously drawn out from the polymerization system.

The average residence time of the polymerization mixture in the polymerization system may be normally from 5 minutes to 5 hours, preferably from 10 minutes to 3 hours, although depending upon kinds of the monomers, the concentration of the catalyst and the polymerization temperature. The pressure of the polymerization system may be normally up to 50 kg/cm$^2$, preferably up to 20 kg/cm$^2$.

The molar ratio of ethylene to the cycloolefin used in the copolymerization may be from 99/1 to 1/99, preferably from 98/2 to 2/98, more preferably from 90/10 to 10/90.

By the copolymerization described above, there is obtained a solution of the cycloolefin random copolymer in the hydrocarbon solvent. The solution may contain the cycloolefin random copolymer in amount of normally from 2.0 to 100%, preferably from 40 to 60% by weight. It further contains the soluble vanadium compound and the organoaluminum compound.

Pellets of the cycloolefin random copolymer can be prepared from the solution of the cycloolefin random copolymer in the hydrocarbon solvent,. by processing it as described herein below.

ASH REMOVAL

The catalyst contained in the solution of the cycloolefin random copolymer in the hydrocarbon solvent drawn out from the polymerization vessel is inactivated normally by addition of a from 5 to 40% by weight aqueous solution of sodium hydroxide, and the so formed catalyst residu is removed from the copolymer solution.

After the removal of the catalyst residue (ash removal), the copolymer solution is normally stored in a container equipped with a stirrer before it is subjected to the subsequent Precipitation step.

PRECIPITATION

Usually, a first precipitation drum equipped with a stirrer is charged with the copolymer solution from the ash removal step and a non-solvent for the copolymer, for example, acetone in appropriate proportions, and the mixture is stirred at an appropriate temperature to precipitate the copolymer in the first precipitation drum.

The resulting dispersion of the copolymer in acetone is then transferred to a second precipitation drum equipped with a stirrer and baffle plates, where it is strongly stirred to effect sufficient precipitation of the copolymer.

FILTRATION

The resulting dispersion of the copolymer in acetone from the second precipitation drum is filtered to provide wet cakes of the copolymer and a filtrate. The filtrate contains an amount of the cycloolefin momoner unreacted as well as solvents including the solvent used in the polymerization step, for example, cyclohexane and the solvent used in the precipitation step, for example, acetone.

The useful substances contained in the filtrate may be respectively isolated for re-use.

EXTRACTION

The wet cakes of the copolymer are then dispersed in a solvent such as acetone, and the resulting dispersion is heated under pressure in an extraction vessel. By doing so, a residual amount of the unreacted cycloolefin monomer in the wet cakes can be extracted.

If desired, two or more extraction vessels may be used in parallel.

CENTRIFUGATION

The dispersion of the copolymer from the extraction step is normally aubjected to cetrifugation to separate wet cakes of the copolymer.

DRYING

The wet cakes of the copolymer from the centrifugation step is first dried under atmospheric pressure in an atmospheric pressure drier heated with steam of a temperature of from 100° to 190° C. The period of time for drying under atmospheric pressure, although depending upon the speed at which the wet cakes are cause to move in the drier, may be normally from 5 to 60 minutes.

The wet cakes so dried under atmospheric pressure is then dried under reduced pressures in a reduced pressure drier heated with steam of a temperature of from 100° to 190° C. The period of time for drying under reduced pressures may be normally from 1 to 4 houts. The eventual pressure in the reduced pressure drier is normally within the range between 1 and 30 Torr.

The product from the drying step is in the form of powder.

PELLETIZING

The particulate copolymer from the drying step is molten by an extruder and pelletized by means of a pelletizer.

EFFECT OF THE INVENTION

In the process for the production of cycloolefin radom copolymers by copolymerzation of ethylene and the cycloolefin according to the invention, solvent-insoluble copolymers having a high ethylene content which will otherwise clogg a filtering device installed in a pipe line for picking up the product from the polymerization vessel are effectively controlled from being formed on the inside circumferential wall of the polymerzation vessel, even if the copolymerization is carried out for a prolonged period of time. Accordingly, it is possible to maintain a continuous and stable running of the apparatus for the production of ethylene-cycloolefin random copolymers for a prolonged period of time. Furthermore, the process according to the invention is productive of ethylene-cycloolefin random copolymers which have a uniform quality and are excellent in heat resistance, heat aging property and various mechanical properties.

The process for the production of cycloolefin random copolymers according to the invention will now be described in detail below with reference to the following examples, to which the invention is in no way limited.

A gel fraction of a random copolymer was determined as follows. About 1 g of the copolymer was dissolved in 200 ml of cyclohexane at room temperature to provide a solution. The solution was caused to pass through a filter of 10 μm mesh, and the filtrate was then caused to pass through a filter of 0.45 μm mesh. After drying those filters, the gel fraction of the copolymer was calculated from the weight of the copolymer used and the increment of the weight of the 10 μm mesh filter and 0.45 μm mesh filter.

EXAMPLE 1

Catalyst preparation $VO(OC_2H_5)Cl_2$ was diluted with cyclohexane to prepare a vanadium catalyst of which vanadium concentration was 6.7 mmol/liter of cyclohexane.

On the other hand, ethyl aluminum sesquichloride, $Al(C_2H_5)_{1.5}Cl_{1.5}$ was diluted with cyclohexane to prepare an organoaluminum catalyst of which aluminum concentration was 107 mmol/liter of cyclohexane.

Polymerization

The copolymerization system used comprised a polymerization vessel equipped with stirrer and having an inner diameter of 700 mm, an overall capacity of 560 liter and an available reaction capacity of 280 liter, a vertical shell-and-fin heat exchanger having a heat transfer area of 19.4 m², a circulating line for drawing out the polymerization liquid from the bottom of the polymerization vessel, circulating the liquid through the heat exchanger and returning the liquid to the polymerization vessel, and a circulating pump installed in the circulating line. Using such a polymerization system, ethylene was continuously copolymerized with a cycloolefin of the formula:

that is, tetracyclo[4,4,0,1$^{2.5}$,1$^{7.10}$]-3-dodecene] (sometimes called merely tetracyclododecene hereinafter). In this copolymerization, the vanadium catalyst (V-catalyst) prepared as described above was fed to the polymerization vessel at a rate so that the concentration of V-catalyst in cyclohexane, which was a polymerization solvent used, might be maintained at 0.6 mmol/l in the polymerization vessel. Just before the feeding of the V-catalyst to the polymerization vessel, the V-catalyst was further diluted with cyclohexane to a V concentration of more than two times that in the polymerization vessel in its dilution rate.

The organoaluminum catalyst prepared above was supplied to the polymerization vessel at a rate so that the Al/V of 8.0 might be maintained in the polymerization vessel. Cyclohexane which was used as a polymerization solvent was fed into the polymerizer at a rate of 205 kg/h. Moreover, 2.84 kg/h of ethylene, 0.2 Nl/h of hydrogen gas as a molecular weight regulator were introduced to the gas phase in the polymerization vessel, and 300 g/h of tetracyclododecene was added to the liquid phase in the vessel.

Around the jacket installed outside the polymerization vessel and the shell side of the shell-and-fin heat exchanger, 25 wt. % aqueous methanol was circulated as a refrigerant so as to control the polymerization temperature to 10° C. The pressure was controlled by introducing nitrogen gas in the vessel so that the polymerization pressure be 1.0 kg/cm²G.

The inside wall of the polymerization vessel was washed in the following way. That is, a partly perforated tray (spray disc) was mounted on that portion of a shaft of the stirrer, which was in the gas phase in the polymerization vessel. Then a cyclohexane solvent at the rate of 50 kg/h and tetracyclododecene at a rate of 12.66 kg/h were fed into the spray disc while rotating the shaft to spray and sprinkle the cyclohexane and tetracyclododecene from the holes in the spray disc by the centrifugal force generated by the rotation of the shaft, on the inside wall of the polymerization vessel above the gas-liquid interface in the vessel. The sprayed tetracyclododecene and cyclohexane fell down along the wall and mixed into the liquid phase.

The copolymerization reaction between ethylene and tetracyclododecene was continuously performed under the above conditions to provide a solution of an ethylene-tetracyclododecene copolymer in cyclohexane

Ash Removal

To the solution of the ethylene-tetracyclododecene copolymer were added boiler water and a 25 wt % NaOH solution as a pH modifier, thereby stopping the copolymerization reaction and the catalyst residue so formed (ash) was removed from the copolymer solution.

The copolymer solution being rid of the ash was once stored in a container with a stirrer having the inner diameter of 900 mm and the effective capacity of 1.0 m³ until the subsequent precipitation operation.

Precipitation

The copolymer solution from the ash removal step and a precipitating solvent (acetone, water content of 1.0 wt. %) were fed into a first precipitation drum at rates of 265 kg/h and 1060 kg/h respectively. The first precipitation drum had an inner diameter of 450 mm and an effective capacity of 100 liter, and baffle plates and a stirrer were installed inside. The stirrer provided on the precipitation drum was composed of six turbine blades, and rotated at a speed of 600 rpm during precipitation. The liquid temperature in the precipitation was 30° to 35° C. The dispersion of precipitated copolymer was caused to overflow and fed once into a second precipitation drum with baffles plate and stirrer, 1.3 m of inner diameter and 2.7 m³ of effective capacity, where precipitation of the copolymer was further proceeded. The rotation speed of the stirrer installed in the second precipitation drum in this operation was 200 rpm.

Filtration

To a filtering machine manufactured by Schumacher Japan (model CF-26) comprising 13 ceramic filters, each having an outer diameter of 70 mm, an inner diameter of 50 mm and a length of 1 m, the copolymer dispersion obtained in the second precipitation drum was fed, and filtered therein. The filtrate was sent to a distillation system, where it was fractionated into the unreacted monomer and the solvents, cyclohexane and acetone, and purified respectively, for re-use. Wet cakes of the copolymer of ethylene and cycloolefin containing acetone, which adhered to the outer surface of the ceramic filters of the filtering machine during the above filtration, were dropped into an extraction bath disposed on a lower part of the filtering machine by intermittent back washing with acetone.

That is, acetone was blown out from an acetone holding drum pressurized up to 4 to 5 kg/cm² by nitrogen gas, into the cylindrical ceramic filters at a rate about 200 liter/once, thereby dropping down wet cakes adhering to the outer surface of the cylindrical ceramic filters into the extraction bath. The above back washing was executed at an interval of about 30 minutes.

Extraction

An extraction vessel equipped with baffle plates and a stirrer and having an inner diameter of 1850 mm and an effective capacity of 6 m³ was used as the extraction bath for receiving the wet cakes dropped from the filtering machine and the acetone used for back washing. Using such an extraction vessel, the above falling objects were heated for two hours at a temperature of 78° C. under pressure and stirring so that tetracyclododecene remaining in the wet cakes be extracted in acetone. This extraction was executed by using two extraction vessels A and B, that is, when the dispersion of the wet cakes in acetone was heated and the extraction of unreacted monomer was executed in the extraction vessel A, the polymer wet cakes and acetone dropped from the filtering machine were received in the other vessel B, and to the contrary, when the copolymer dispersion was heated and unreacted monomer was extracted in the extraction vessel B, the wet cakes and acetone falling from the filtering machine were received in the other vessel A. In this way, the extraction vessels A and B were used alternately.

Centrifugal separation

The copolymer dispersion on which extraction was carried out in the above way was separated into solid and liquid by using a super-decanter produced by Tomoe Kogyo (model P-4400), thereby batching off the wet cakes of the copolymer.

Drying

The copolymer wet cakes processed through the above centrifugal separation was, at first, dried at normal pressure by using an atmospheric drier (produced by Nara Sciki, model NPD-3w-w). During this atmospheric drying, steam at a temperature of 120° C. was passed through a jacket and screw of the atmospheric dryer, and the copolymer wet cakes were thereby heated. The time for drying was determined based on a carrying speed of the wet cakes by means of the screw installed in the atmospheric drier, but it was practically from 20 to 30 minutes.

The copolymer wet cakes dried under normal pressure as stated above was, next, subjected to vacuum drying in a vacuum dryer (made by Tamagawa Machines, 2 m³ of capacity, vacuum stirring drier). During this vacuum drying, steam at a temperature of 140° C. was passed through a jacket and agitating element of the vacuum dryer, and the wet cakes of copolymer were thereby heated. The time for vacuum drying was set at 2.5 hours. The final pressure in the vacuum drying was practically in the range of from 5 to 10 Torr. The copolymer powder obtained by drying wet cakes of copolymer in the above way once stored in a powder silo having a capacity of 2 m³.

Pelletizing

The copolymer powder was melt extruded using a twin-screw extruder (made by The Japan Steel Works, Ltd., TEX-44), and pelletized by means of a hot cut pelletizer. A filter having meshes of 5 μm or 10 μm was mounted between the extruder and the pelletizer for the purpose of removing fine foreign matters in molten polymer.

When the above described series of apparatus from the polymerization vessel to the pelletizer were continuously operated for two months, the pumping operation of the circulating pump became unstable. Then, the operation of the apparatus was stopped and the inspection was executed by opening the polymerization vessel to find that a lump in the size of a football was formed at the feed nozzle of the V-catalyst. This lump was supposed to cause unstable pumping of liquid in the circulating pump. Copolymers of ethylene and cycloolefin insoluble in cyclohexane were also observed adhering in a belt shape on the inside circumferential surface of the polymerization vessel at a level at a level in the vicinity of the gas-liquid interface in the polymerization vessel. However, the life of the polymer filter of 10 μm meshes installed between the extruder and pelletizer was lengthened to one month. The content of cyclohexane insolubles (gel fraction) of the copolymer obtained by the above polymerization reaction is shown in Table 2. The continued period of time for stable running of the polymerization and the life of the polymer filter provided between the extruder and pelletizer are also shown in Table 2.

COMPARATIVE EXAMPLE 1

Example 1 was repeated except that the liquid fed to the tray was limited only to cyclohexane which was a solvent, and tetracyclododecene was supplied to a pipe line linking the shell-and-fin heat exchanger with the polymerization vessel.

After the three-week continuous operation, the current consumption of the circulating pump became unstable. The circulating pump was then opened to find that it was clogged with copolymers insoluble in cyclohexane. By stopping the above operation and inspecting inside the polymerization vessel, copolymers of ethylene and cycloolefin insoluble in cyclohexane were observed adhering in a belt shape on the inside circumferential surface of the polymerization vessel at a level in the vicinity of the gas-liquid interface in the polymerization vessel. As a consequence, the obstruction of the pump was supposed to be the copolymers insoluble in cyclohexane formed on the inside circumferential wall of the polymerization vessel at a level near the gas-liquid interface in the vessel, which dropped down, flowed out from the polymerization vessel and caused clogging of the circulating pump. The composition of the copolymers insoluble in cyclohexane was analyzed to find that the content of ethylene was 90%.

The continued period of time for stable running of the polymerization and the life of the polymer filter provided between the extruder and pelletizer are also shown in Table 2.

TABLE 2

|  | Example 1 | Comp. Ex. 1 |
|---|---|---|
| Continued period of time for stable running of polymerization vessel | 2 months | 3 weeks |
| Gel fraction | 0.08% | 0.3% |
| Life of polymer filter |  |  |
| 10 μm | 1 month | 4 days |
| 5 μm | 8 days | 1.5 days |

What is claimed is:

1. A process for the production of cycloolefin random copolymers comprising copolymerizing ethylene with at least one cycloolefin of the general formula [I] noted below in a liquid phase in the presence of a catalyst and a hydrocarbon solvent in a polymerization vessel, wherein ethylene is copolymerized with the cycloolefin while feeding the liquid cycloolefin alone or a homogeneous solution of a mixture of the cycloolefin and the solvent onto the inside circumferential wall of the polymerization vessel above the gas-liquid interface in the polymerization vessel,

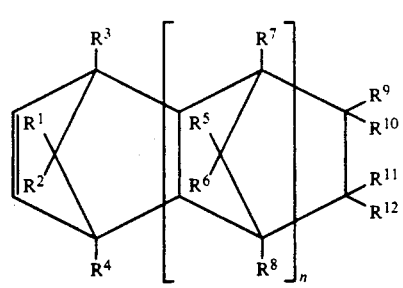

wherein n is 0 or a positive integer, and $R^1$ to $R^{12}$ are the same or different, and each represents a hydrogen or halogen atom or a hydrocarbon group, or $R^9$ (or $R^{10}$) and $R^{11}$ (or $R^{12}$), when taken together, may form a mono- or poly-cyclic ring.

2. The process according to claim 1 wherein said cycloolefin or said mixture of the cycloolefin and the solvent is fed by spraying or pouring it onto inside circumferential wall of the polymerization vessel above the gas-liquid interface in the polymerization vessel.

3. The process according to claim 1 wherein said solvent is an aliphatic, alicyclic or aromatic hydrocarbon.

4. The process according to claim 1 wherein said catalyst comprised a vanadium compound soluble in said solvent and an organoaluminum compound.

5. The process according to claim 1 wherein said homogeneous solution of a mixture of the cycloolefin and the solvent comprises at least 5 wt % of the cycloolefin.

* * * * *